United States Patent [19]
Fujisawa et al.

[11] Patent Number: 5,262,502
[45] Date of Patent: Nov. 16, 1993

[54] ISOBUTYLENE BASE POLYMER HAVING FUNCTIONAL GROUP AND PROCESS FOR PREPARING THE SAME

[75] Inventors: Hiroshi Fujisawa; Kouji Noda; Kazuya Yonezawa, all of Kobe, Japan

[73] Assignee: Kanegafuchi Chemical Industry Co., Ltd., Osaka, Japan

[21] Appl. No.: 958,764

[22] Filed: Oct. 9, 1992

[30] Foreign Application Priority Data

Oct. 14, 1991 [JP] Japan ................................. 3-295115

[51] Int. Cl.$^5$ ............................................. C08F 216/12
[52] U.S. Cl. ...................................... 526/313; 526/90; 526/185; 526/190; 526/238
[58] Field of Search ................ 526/313, 90, 185, 190, 526/238

[56] References Cited

U.S. PATENT DOCUMENTS 5,084,490  1/1992  McArdle et al. .................... 522/181

FOREIGN PATENT DOCUMENTS 0180982  5/1986  European Pat. Off. .
0265053  4/1988  European Pat. Off. .
2294192  7/1976  France .

OTHER PUBLICATIONS

Patent Abstracts Of Japan, vol. 12, No. 372, C-533, 3219, Oct. 5, 1988, "Novel Ethylene Copolymer".

*Primary Examiner*—Joseph L. Schofer
*Assistant Examiner*—Mark Nagumo
*Attorney, Agent, or Firm*—Wegner, Cantor, Mueller & Player

[57] ABSTRACT

An isobutylene base polymer with a functional group having repeating units derived from isobutylene and at least one unit of the formula:

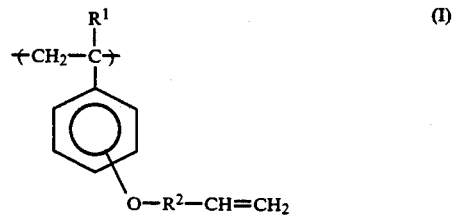

wherein $R^1$ is a hydrogen atom, a methyl group or an ethyl group and $R^2$ is a divalent organic group, and a number average molecular weight of 500 to 500,000.

8 Claims, No Drawings

ISOBUTYLENE BASE POLYMER HAVING FUNCTIONAL GROUP AND PROCESS FOR PREPARING THE SAME

BACKGROUND OF THE INVENTION

1. Field of the Invention

The present invention relates to an isobutylene base polymer having a functional group and a process for preparing the same.

2. Description of the Prior Art

A polymer having a vinyl group at its molecular chain end or in a grafted chain is useful as a raw material of an adhesive, a modifier, a coating material, a sealing material and the like.

As a preparation method an isobutylene base polymer having a terminal functional group which is one of the above described polymers, the Inifer method is known from U.S. Pat. No. 4,276,394, which method comprises cationically polymerizing isobutylene in the presence of 1,4-bis(α-chloroisopropyl)benzene (hereinafter referred to as "p-DCC") as an initiator/chain-transfer agent and $BCl_3$ as a catalyst.

It is also known that the isobutylene base polymer having chlorine atoms at both chain ends as produced by the Inifer method or after purification can be converted to a polymer having allyl groups at both chain ends through the reaction of the isobutylene base polymer with allyltrimethylsilane in the presence of $BCl_3$ and $TiCl_4$ as a further catalyst (see Japanese Patent Kokai Publication No. 105005/1988 corresponding to U.S. Pat. No. 4,758,631).

However, by the above method, the allyl groups are introduced only at the chain ends. In order to introduce more than two allyl groups in one molecule, a compound having two or more polymerization initiating sites such as p-DCC should be used.

An isobutylene base polymer having an unsaturated group is obtained by copolymerizing isobutylene and a conjugated diene. But, a produced polymer has inferior weather resistance since an unsaturated group due to 1,4-addition is introduced in a main chain. When isobutylene and the nonconjugated diene are copolymerized, a produced polymer has no unsaturated group, but the polymerization reaction does not proceed smoothly.

SUMMARY OF THE INVENTION

One object of the present invention is to provide a novel isobutylene base polymer having plural vinyl groups in a molecule but no unsaturated group in a main chain.

Another object of the present invention is to provide a process for preparing an isobutylene base polymer having plural vinyl groups in a molecule without using an expensive compound such as p-DCC.

According to a first aspect of the present invention, there is provided an isobutylene base polymer with a functional group comprising repeating units derived from isobutylene and at least one unit of the formula:

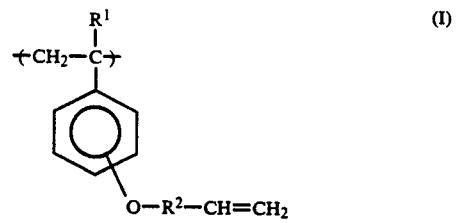

wherein $R^1$ is a hydrogen atom, a methyl group or an ethyl group and $R^2$ is a divalent organic group, and having a number average molecular weight of 500 to 500,000.

According to a second aspect of the present invention, there is provided a process for preparing the above isobutylene base polymer comprising polymerizing a cationically polymerizable monomer containing isobutylene and a non-conjugated diene of the formula:

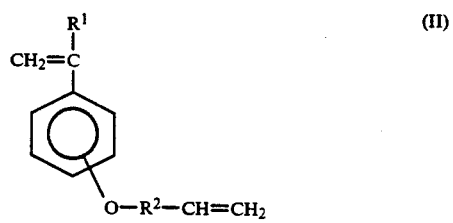

wherein $R^1$ and $R^2$ are the same as defined above, in the presence of a Lewis acid.

DETAILED DESCRIPTION OF THE INVENTION

The isobutylene base polymer of the present invention is characterized in that one molecule of the polymer contains at least one unit of the formula (I).

In the formula (I), $R^1$ is a hydrogen atom, a methyl group or an ethyl group, preferably a hydrogen atom or a methyl group.

$R^2$ is a divalent organic group. Preferably, the divalent organic group is a substituted or unsubstituted divalent hydrocarbon group, more preferably a divalent saturated hydrocarbon group, in particular a group of the formula: $-(CH_2)_n-$ wherein n is a number of 1 to 30.

In the formulas (I) and (II), the group: $-O-R^2-CH=CH_2$ is preferably present at an ortho- or para-position, in particular at the para-position.

The isobutylene base polymer of the present invention has a number average molecular weight of 500 to 500,000, preferably 1000 to 50,000. When the number average molecular weight is less than 500, the polymer does not have characteristics of the isobutylene base polymer since a content of isobutylene units is small. When the number average molecular weight exceeds 500,000, the polymer becomes resin-like and its handling is difficult.

The number of the above unit of the formula (I) is at least one, preferably at least 1.05 per one molecule on the average.

The term "cationically polymerizable monomer containing isobutylene" herein used is not limited to pure isobutylene but includes a monomer mixture of isobutylene and 50% by weight or less of at least one cationically polymerizable monomer which is copolymerizable with isobutylene.

The cationically polymerizable monomers copolymerizable with isobutylene include olefins having 3 to 12 carbon atoms, conjugated dienes, vinyl ethers, aromatic vinyl compounds and the like. Among them, the olefins are preferred.

Specific examples of the cationically polymerizable monomers copolymerizable with isobutylene are propylene, 1-butene, 2-butene, 2-methyl-1-butene, 3-methyl-2-butene, pentene, 4-methyl-1-pentene, hexene, vinylcyclohexane, butadiene, isoprene, cyclopentadiene, methyl vinyl ether, ethyl vinyl ether, isobutyl vinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, γ-methacryloyloxypropyltrimethoxysilane, γ-methacryloyloxypropylmethyldimethoxysilane, p-hydroxystyrene and the like. They may be used independently or as a mixture of two or more of them.

The non-conjugated diene used in the present invention is represented by the above formula (II).

Insofar as a compound is included in the formula (II), any of known or novel compounds is used. Preferred examples of the non-conjugated compound of the formula are

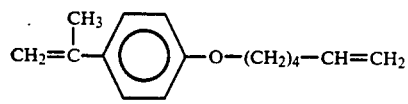

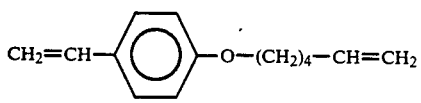

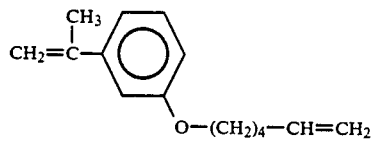

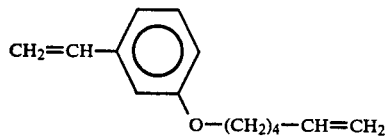

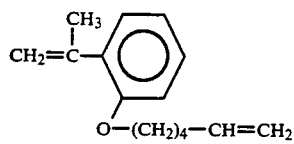

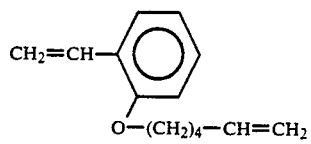

-continued

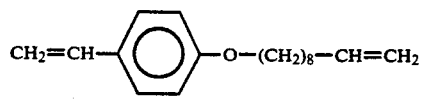

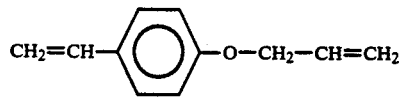

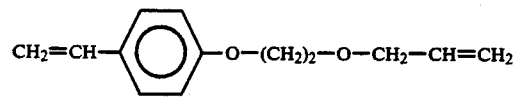

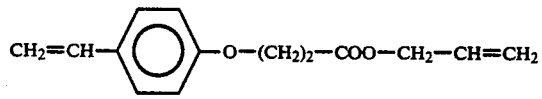

Since the ether group is bonded to the benzene ring, the monomer of the formula (II) has a high cationic polymerizability and is easily copolymerized with isobutylene so that the isobutylene base polymer having the vinyl group is easily obtained.

In the process of the present invention, a Lewis acid is used as a catalyst. Examples of a Lewis acid are a compound of the formula: $MX_p$ wherein M is a metal atom, X is a halogen atom and p is a valency of the metal atom M and at least 2 (e.g. $AlCl_3$, $SnCl_4$, $TiCl_4$, $VCl_5$, $FeCl_3$, $BF_3$, etc.), organic aluminum compounds (e.g. $Et_2AlCl$, $EtAlCl_2$, etc.) and the like. Among them, $SnCl_4$, $TiCl_4$, $Et_2AlCl$ and $EtAlCl_2$ are preferred.

The Lewis acid is used in an amount of 0.1 to 50 moles, preferably 0.2 to 10 moles per one mole of the nonconjugated diene which is copolymerized with the cationically polymerizable monomer containing isobutylene. When the amount of the Lewis acid is less than 0.1 mole, a yield of the polymerization reaction tends to decrease, while when this amount exceeds 50 moles, no better effect is achieved.

In the process of the present invention, as a solvent, a hydrocarbon solvent such as an aliphatic hydrocarbon or a halohydrocarbon is used. Among them, a halohydrocarbon, in particular, chlorohydrocarbon is preferred. Specific examples of the aliphatic hydrocarbon solvent are pentane and hexane, and specific examples of the halohydrocarbon are chloromethane, chloroethane, methylene chloride, 1,1-dichloroethane, chloroform, 1,2-dichloroethane and the like. They may be used independently or in combination. The hydrocarbon solvent may contain a small amount of other solvent such as an acetate (e.g. ethyl acetate), an organic compound having a nitro group (e.g. nitroethane) or a pyridine compound (e.g. 2,6-di-tert.-butylpyridine, 2,6-dimethylpyridine, etc.)

A mode of polymerization in the process of the present invention is not limited and any of conventional polymerization process can be employed. For example, the process of the present invention can be carried out batchwise by successively charging the polymerization solvent, the cationically polymerizable monomer containing isobutylene, the non-conjugated diene and the polymerization catalyst in one reactor. Alternatively, the process can be carried out by reacting the monomers while continuously charging the polymerization solvent, the cationically polymerizable monomer containing isobutylene, the non-conjugated diene and the polymerization catalyst in a reaction system and recovering the polymer.

In the process of the present invention, a polymerization temperature is usually from $-80°$ to $+10°$ C., preferably from $-40°$ to $0°$ C. A polymerization time is usually from 0.5 to 120 minutes, preferably from 1 to 60 minutes.

A monomer concentration of the cationically polymerizable monomer containing isobutylene is usually from 0.1 to 8 moles, preferably from 0.5 to 5 moles per one liter of the solvent.

An amount of the non-conjugated diene to be charged in the polymerization system is from 0.002 to 1 mole, preferably from 0.01 to 0.1 mole per one mole of the cationically polymerizable monomer containing isobutylene. When the amount of the non-conjugated diene is less than 0.002 mole, it is difficult to introduce at least one unit of the formula (I) in one molecule of the polymer. When the amount of the non-conjugated diene is larger than one mole, the produced polymer may lose the characteristics of the isobutylene base polymer.

The polymerization reaction is preferably terminated with an alcohol such as methanol in view of each handling of the produced polymer, though it is possible to terminate the polymerization reaction by other conventional manner. It is not necessary to proceed any termination reaction.

By the above polymerization process, the isobutylene base polymer of the present invention is prepared.

The isobutylene base polymer produced by the process of the present invention has no unsaturated group in the main chain and good weather resistance.

Since at least one active vinyl group is introduced in one molecule by the above process without using the initiator chain-transfer agent, the polymer is economically prepared.

Further, the polymerization proceeds easily. By the adjustment of the amount of the non-conjugated diene, a polymer having a different functional group can be prepared easily.

The produced polymer as such is used as a raw material of a crosslinked cured material. The functional group of the polymer can be converted to a hydroxyl group, an amino group, an alkoxysilyl group or a hydrogensilyl group.

PREFERRED EMBODIMENTS OF THE INVENTION

The present invention will be explained further in detail by following Examples.

SYNTHESIS EXAMPLE 1

To a 500 ml egg-plant type flask, 4-hydroxybenzaldehyde (12.2 g, 100 mmol), a 28% solution of sodium methylate in methanol (18.5 ml, 130 mmol of sodium methylate), methanol (60 ml) and 6-bromo-1-hexene (20.0 ml, 150 mmol) were charged and heated under reflux for 18 hours. The reaction mixture was concentrated to about a half volume by evaporation of volatile components. Then, toluene (200 ml) and water (100 ml) were added to the concentrated mixture and shaken, followed by removal of an aqueous phase. An organic phase was washed with water (150 ml×3) and dried over anhydrous magnesium sulfate (10 g). After removing solids by filtration, volatile components were evaporated off from a filtrate to obtain 4-(1-hexenyloxy)benzaldehyde (18.9 g).

SYNTHESIS EXAMPLE 2

To a 200 ml three-necked flask in a nitrogen atmosphere, anhydrous diethyl ether (150 ml), methyltriphenylphosphonium bromide (7.5 g, 21 mmol) and a 1.6N solution of n-butyllithium in hexane (13.1 ml, 21 mmol of n-butyllithium) were charged and stirred at room temperature for 5 hours to prepare methylenephosphorane. To the reaction mixture, a solution of 4-(1-hexenyloxy)benzaldehyde (4.08 g, 20 mmol) in anhydrous diethyl ether (20 ml) was dropwise added over 3 minutes. After heating the reaction mixture under reflux for one hour and removing solids by filtration, hexane (150 ml) was added to a filtrate, and an organic phase was washed with water (150 ml×3), followed by evaporating volatile components off to obtain 4-(1-hexenyloxy)styrene (3.0 g) of the formula:

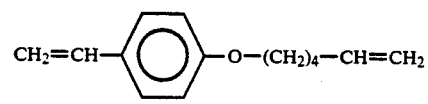

(Non-conjugated diene A)

$^1$H-NMR (300 MHz, CDCl$_3$) $\delta=6.8$–7.4 (4H), 6.7 (1H), 5.8 (1H), 5.6 (1H), 5.2 (1H), 4.9–5.1 (2H), 4.0 (2H), 2.1 (2H), 1.8 (2H), 1.6 (2H).

IR spectrum (cm$^{-1}$): 1640 (m=medium), 1630 (m), 1610 (s=strong), 1510 (s), 1250 (s), 1175 (m), 990 (m), 850 (m), 780 (s).

EXAMPLE 1

A 100 ml pressure-resistant glass autoclave equipped with a stirrer, a three way stop-cock and a vacuum line was dried by heating at 100° C. for one hour while evacuating the autoclave through the vacuum line. After cooling down to room temperature, nitrogen gas was injected through the three way stop-cock up to atmospheric pressure.

Thereafter, methylene chloride (40 ml) which had been dried with calcium hydride as a main solvent was introduced in the autoclave using an injector while flowing nitrogen gas in the autoclave from one way of the three way stop-cock, and then Non-conjugated diene A (1 mmol) was charged.

After connecting a pressure resistant glass-made liquefied gas-collecting tube equipped with a needle valve containing isobutylene (5 g) which had been dried by passing it through a column filled with barium oxide to the three way stop-cock, the autoclave was dipped in a dry ice-acetone bath at $-70°$ C. and cooled while stirring the content in the autoclave for one hour. Then, after the internal space of the autoclave was evacuated with the vacuum line, the needle valve was opened to introduce isobutylene in the autoclave from the gas-collecting tube. Nitrogen gas was introduced in the autoclave from the three way stop-cock up to atmospheric pressure. The autoclave was dipped in a dry ice-acetone bath at $-30°$ C. and the content was stirred for further one hour so as to increase an internal temperature to $-30°$ C.

In the autoclave, TiCl$_4$ (1.1 ml, 10 mmol) was added with an injector through the three way stop-cock to initiate a polymerization reaction. After 20 minutes, methanol which had been cooled at 0° C. or lower was added to terminate the reaction.

The reaction mixture was recovered from the autoclave into an egg-plant type flask, and unreacted isobutylene, methylene chloride and methanol were evaporated off. A remaining polymer was dissolved in n-hexane (100 ml), and the solution was washed with water repeatedly till the washing water became neutral. Thereafter, the n-hexane solution was concentrated to 20 ml and poured in acetone (300 ml) to precipitate the polymer. The precipitated polymer was again dissolved in n-hexane (100 ml) and the solution was dried over anhydrous magnesium sulfate and filtered, followed by evaporating n-hexane off under reduced pressure to obtain an isobutylene base polymer.

A yield of the polymer was calculated from the amount of the obtained polymer. Mn and Mw/Mn were measured by GPC, and contents of the monomers in the polymer were determined by measuring intensities of resonance signals of protons assigned to each chemical structure by $^1$H-NMR (300 MHz).

For the GPC measurement, a WATERS' system (including a pump 600 E and a differential refractometer 401) was used. Shodex K-804 (manufactured by Showa Denko Co., Ltd.) was used as a column and chloroform was used as a mobile phase.

The results are shown in Table 2.

EXAMPLES 2-7

In the same manner as in Example 1 but using a non-conjugated diene (A to D) in an amount of Table 1 and a polymerization catalyst shown in Table 1, a polymer was prepared and evaluated. The results are shown in Table 2.

Non-conjugated diene B
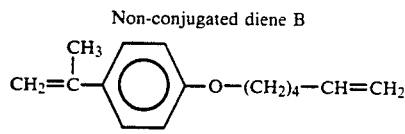

Non-conjugated diene C
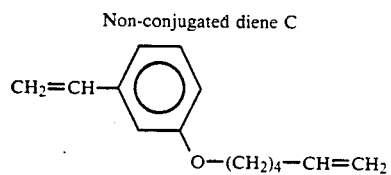

Non-conjugated diene D
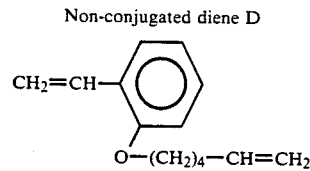

EXAMPLE 8

In the same manner as in Example 1 but carrying out the polymerization reaction at $-10°$ C., a polymer was prepared and evaluated. The results are shown in Table 2.

COMPARATIVE EXAMPLE

In the same manner as in Example 1 but using no non-conjugated diene, a polymer was prepared and evaluated. The results are shown in Table 2.

EXAMPLE 9

According to Example 9 of Japanese Patent Kokai Publication No. 95266/1991 corresponding to EP-A-0 431 173, a hydrocarbon base addition type curing agent was prepared from 1,9-decadiene and polyhydrogensiloxane (LS 8600 manufactured by Shin'etsu Chemical Co., Ltd.).

In the same manner as in Example 11 of the above Kokai Publication using this curing agent, the isobutylene base polymer was cured. From a cured material, a No. 3 dumbbell shape sample was cut and subjected to a tensile test at a pulling rate of 200 mm/min. The results are as follows:

Elongation at break: 111%:

Tensile strength at break: 7.6 kgf/cm$^2$:

EXAMPLE 10

A viscosity of the isobutylene base polymer prepared in Example 1 was measured at 23° C. using an E type viscometer. The viscosity was 6300 poises.

A viscosity of the polymer prepared in Comparative Example was also measured. However, since the polymer was rubber-like, the measurement was impossible.

From the above viscosity, it is understood that the viscosity of the polymer was decreased by the presence of the non-conjugated diene in the polymer.

In view of the processability of the isobutylene base polymer in the preparation of the cured product, the lower viscosity is better since compounding of various additives in the polymer is easy.

TABLE 1

| Example | Non-conjugated diene | | |
| No. | Kind | Amount (mmol) | Catalyst |
| --- | --- | --- | --- |
| 1 | A | 1 | TiCl$_4$ |
| 2 | A | 2 | TiCl$_4$ |
| 3 | B | 1 | TiCl$_4$ |
| 4 | C | 1 | TiCl$_4$ |
| 5 | D | 1 | TiCl$_4$ |
| 6 | A | 1 | EtAlCl$_2$ |
| 7 | D | 1 | EtAlCl$_2$ |
| 8 | A | 1 | TiCl$_4$ |
| Comparative | — | — | TiCl$_4$ |

TABLE 2

| Example No. | Yield (%) | Mn | Mw/Mn | Fn$^{1)}$ of non-conjugated diene |
| --- | --- | --- | --- | --- |
| 1 | 96 | 15000 | 2.3 | 3.2 |
| 2 | 95 | 14100 | 2.5 | 6.1 |
| 3 | 96 | 10000 | 2.3 | 2.0 |
| 4 | 90 | 15200 | 2.4 | 2.0 |
| 5 | 94 | 15300 | 2.6 | 2.9 |
| 6 | 90 | 16000 | 2.7 | 3.6 |
| 7 | 93 | 15500 | 2.5 | 3.1 |
| 8 | 94 | 9800 | 2.3 | 2.3 |
| Comparative | 97 | 14700 | 2.2 | 0 |

Note:
$^{1)}$An averaged number of the non-conjugated diene units in one molecule of the polymer.

What is claimed is:

1. An isobutylene base polymer with a functional group comprising repeating units derived from isobutylene east one unit of the formula:

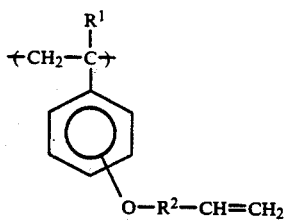
(I)

wherein $R^1$ is a hydrogen atom, a methyl group or an ethyl group and $R^2$ is a divalent saturated hydrocarbon group, and having a number average molecular weight of 500 to 500,000.

2. The isobutylene base polymer according to claim 1, wherein $R^1$ is a hydrogen atom.

3. The isobutylene base polymer according to claim 1, wherein $R^2$ is a group of the formula: —$(CH_2)_n$— in which n is an integer of 1 to 30.

4. The isobutylene base polymer according to claim 1, wherein $R^1$ is a hydrogen atom and $R^2$ is a group of the formula: $(CH_2)_n$— in which n is an integer of 1 to 30.

5. A process for preparing an isobutylene base polymer as claimed in claim 1 comprising polymerizing (a) isobutylene or a monomer mixture of isobutylene and 50% by weight or less of at least one cationically polymerizable monomer which is copolymerizable with isobutylene, with (b) a non-conjugated diene of the formula:

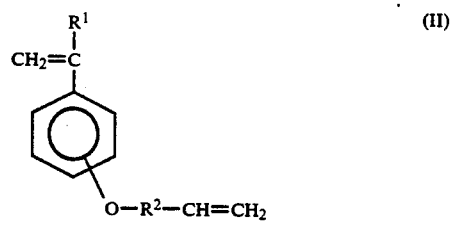
(II)

wherein $R^1$ and $R^2$ are the same as defined above, in the presence of a Lewis acid.

6. The method according to claim 5, wherein $R^1$ is a hydrogen atom.

7. The method according to claim 5, wherein $R^2$ is a group of the formula: —$(CH_2)_n$— in which n is an integer of 1 to 30.

8. The method according to claim 5, wherein $R^1$ is a hydrogen atom and $R^2$ is a group of the formula: —$(CH_2)_n$— in which n is an integer of 1 to 30.

* * * * *